US006735247B2

(12) United States Patent
Lundby

(10) Patent No.: US 6,735,247 B2
(45) Date of Patent: May 11, 2004

(54) METHOD AND APPARATUS IN A COMMUNICATION SYSTEM

(75) Inventor: Stein A. Lundby, Solano Beach, CA (US)

(73) Assignee: Qualcomm, Incorporated, San Diego, CA (US)

( * ) Notice: Subject to any disclaimer, the term of this patent is extended or adjusted under 35 U.S.C. 154(b) by 310 days.

(21) Appl. No.: 09/823,532

(22) Filed: Mar. 30, 2001

(65) Prior Publication Data

US 2002/0141505 A1 Oct. 3, 2002

(51) Int. Cl.[7] .................................................. H04B 7/005
(52) U.S. Cl. ........................ 375/227; 375/141; 375/146; 375/297; 370/342; 455/522
(58) Field of Search ................................. 375/130, 146, 375/297, 140, 141, 227; 370/335, 342; 455/69, 70, 522

(56) References Cited

U.S. PATENT DOCUMENTS 5,799,005 A * 8/1998 Soliman ...................... 370/335
6,101,179 A * 8/2000 Soliman ...................... 370/342
6,137,841 A   10/2000 Velez et al. .................. 375/298
6,286,994 B1 * 9/2001 Boesel et al. ................ 374/146
6,377,813 B1 * 4/2002 Kansakoski et al. ......... 455/522
6,498,785 B1 * 12/2002 Derryberry et al. ......... 370/311
6,512,925 B1 * 1/2003 Chen et al. .................. 455/442

FOREIGN PATENT DOCUMENTS

EP          0 977 371 A2 *  2/2000

* cited by examiner

Primary Examiner—Young T. Tse
(74) Attorney, Agent, or Firm—Philip R. Wadsworth; Thien Nguyen; S. Hossain Beladi

(57) ABSTRACT

In a communication system, a method and an accompanying apparatus provide for efficient modulation and demodulation processes. In a transmitter (100), a ratio of power level of a communication channel over power level of a pilot channel is determined to produce a power level ratio. The power level ratio is quantized within a finite digital word. A quantized quadrature amplitude modulation distance, in a quadrature amplitude modulation constellation, is determined based on the quantized power level ratio. A signal, in accordance with a quadrature amplitude modulation technique, is modulated using the quantized distance, and transmitted to a receiver (160).

15 Claims, 3 Drawing Sheets

METHOD AND APPARATUS IN A COMMUNICATION SYSTEM

BACKGROUND

1. Field

The disclosed embodiments relate to the field of communications, and more particularly, to communications using quadrature amplitude modulation.

2. Background

Multilevel modulation may be used in communications of digital signals. In a multilevel modulation technique, the modulation level of each point in a constellation representing the modulation is fixed during the modulation process. One of the multilevel modulation techniques is commonly known as quadrature amplitude modulation (QAM). In QAM, the constellation may be represented by an equidistant constellation. The points in an equidistant constellation are arranged in a way in the constellation such that the distance between two adjacent points for all the points in the constellation is equal. The distance between the points represents an amplitude difference in the multilevel modulation process.

A receiver receiving a signal modulated in accordance with a QAM technique relies on information relating to the amplitude difference or the distance between each point in the constellation to demodulate the received signal. Often times, the amplitude difference or the distance between each point is communicated to the receiver via a digital word with a finite number of digits. In a system, where the distance between each point in the constellation may be changing from one transmission to another, the receiver communicates the updated value periodically. The value of the amplitude difference or the distance between each point in the constellation may fall between the values that the digital word can represent due to a finite quantization. Therefore, the transmitter may not be able to communicate an exact value of the amplitude difference or the distance between each point in the constellation. Such a quantization error may lead to inaccuracy in the demodulation process, and resulting in poor performance.

To this end as well as others, there is a need for an improved communication system.

SUMMARY

In a communication system, a method and an accompanying apparatus provide for efficient modulation and demodulation processes. In a transmitter, a ratio of power level of a communication channel over power level of a pilot channel is determined to produce a power level ratio. The power level ratio is quantized within a finite digital word. A quantized quadrature amplitude modulation distance, in a quadrature amplitude modulation constellation, is determined from the quantized power level ratio, and the quantized ratio is communicated to a receiver. A signal, in accordance with a quadrature amplitude modulation technique, is modulated using the quantized distance.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

A system for wireless communications in accordance with the CDMA technique has been disclosed and described in various standards published by the Telecommunication Industry Association (TIA). Such standards are commonly known as TIA/EIA/IS-2000, TIA/EIA/95A/B, and WCDMA, among several others. The "$3^{rd}$ Generation Partnership Project" (3GPP) is embodied in a set of documents including Document No. 3G TS 25.211, 3G TS 25.212, 3G TS 25.213, and 3G TS 25.214, known as the WCDMA standard; the "TIA/EIA/IS-95 Remote Station-Base Station Compatibility Standard for Dual-Mode Wideband Spread Spectrum Cellular System" is known as the IS-95 standard; the "TR-45.5 Physical Layer Standard for cdma2000 Spread Spectrum Systems" is known as the CDMA-2000 standard; each incorporated by reference herein.

Generally stated, a novel and improved method and an accompanying apparatus provide for an efficient modulation process and demodulation process in, respectively, a transmitter and a receiver in a code division multiple access communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. The exemplary embodiment described herein is set forth in the context of a digital communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application may be represented by voltages, currents, electromagnetic waves, magnetic fields or particles, optical fields or particles, or a combination thereof. In addition, the blocks shown in each block diagram may represent hardware or method steps.

Figure 1A:
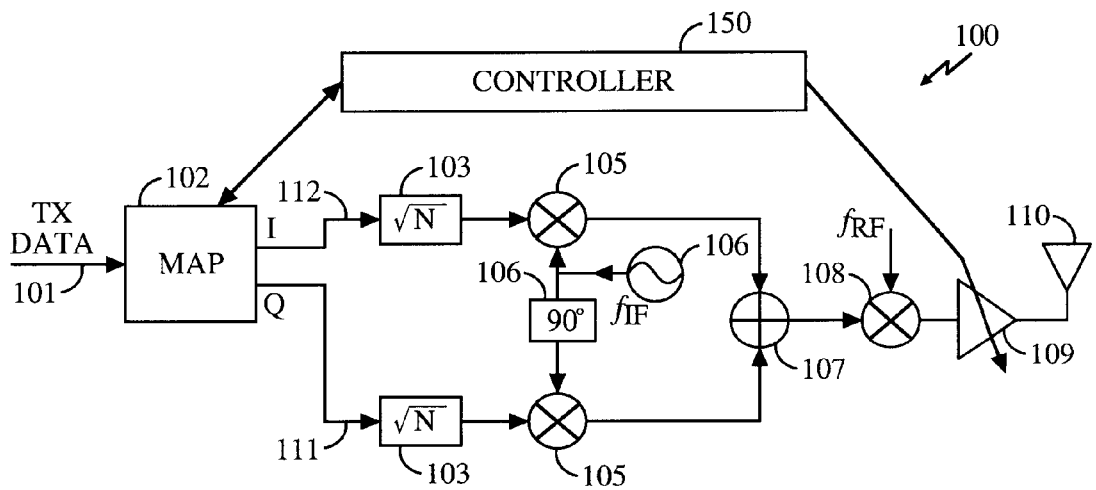
FIG. 1A illustrates a block diagram of a transmitter operating in accordance with various embodiments.
Figure 1B:
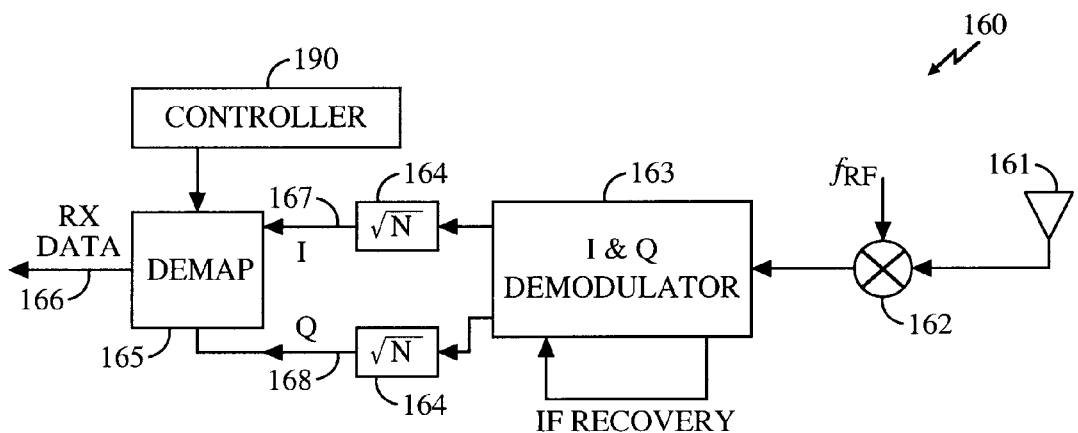
FIG. 1B illustrates a block diagram of a receiver operating in accordance with various embodiments.

FIG. 1A and FIG. 1B depict, respectively, a general block diagram of a transmitter 100 and a receiver 160 operating in combination for communication of data in accordance with various embodiments. Transmitter 100 modulates digital data at an input 101 in accordance with quadrature amplitude modulation (QAM) for transmission, and in accordance with various embodiments. The modulated signal is transmitted to receiver 160. Receiver 160 operates to receive signals from transmitter 100 in accordance with various embodiments. The digital data at input 101 may be produced from many different devices, such as a telephone, video, speech source, etc. The digital data is converted to a digital signal representing one's and zero's contained in the data. The data bits in digital format may be mapped onto a constellation resulting in a two-dimensional plot in a rectangular coordinate system in accordance with a QAM technique. The selected QAM technique may be a multilevel modulation, such as 16-QAM or 64-QAM. In accordance with a QAM technique, a mapping block 102 may be used to map the input data bits into I and Q data symbols. Signals 112 and 111, for respectively representing I and Q data symbols, may be produced. The resulting I and Q data symbols are modulated in transmitter 100 in accordance with various embodiments.

Figure 2:
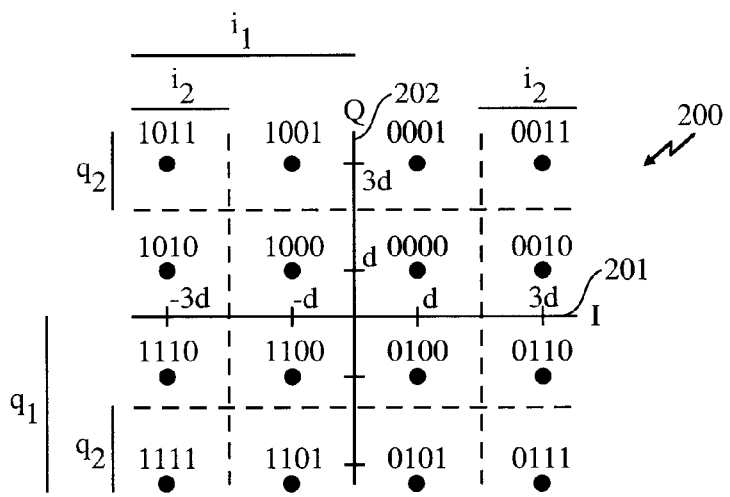
FIG. 2 illustrates an exemplary quadrature amplitude modulation constellation.

FIG. 2 depicts an exemplary 16-QAM constellation 200. The mapping block 102 may use constellation 200 for mapping the input data bits into I and Q data symbols. For example, in 16-QAM, the phasor in the constellation 200 may be represented by a four-bit data symbol constituted by I and Q data bits. The rectangular axes 201 and 202 represent, respectively, the I and Q components. The quaternary quadrature components of I and Q may be assigned to locations 3d, d, −d, and −3d from each axis. The symbols represented by data bits 0000, 11000, 1100, and 0100 are at distance "d" from each axis. The symbols 1011, 0011, 0111, and 1111 are at distance "3d" away from each axis. Other symbols are at "d" or "3d" distance away from either I or Q axis. All the adjacent symbols are at an equal distance from each other. To modulate an "I" component data symbol, the amplitude of the signal representing the data symbol for duration of a data symbol is adjusted to match the distance from the I-axis. Similarly, to modulate a "Q" component data symbol, the amplitude of the signal representing the data symbol for duration of a data symbol is adjusted to match the distance from the Q-axis.

Figure 3:
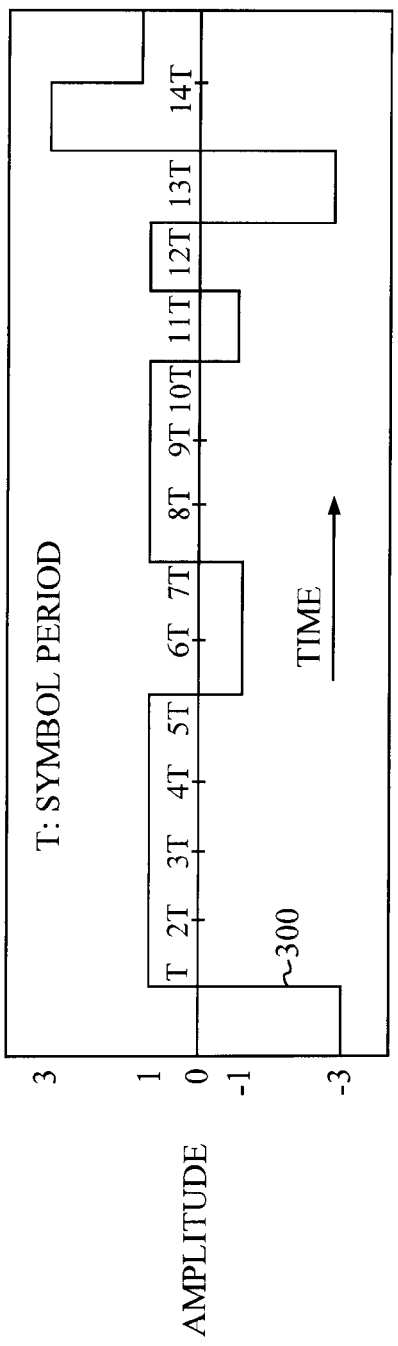
FIG. 3 illustrates graph of an amplitude of a quadrature amplitude modulated signal versus time.

FIG. 3 depicts amplitude with respect to time of an exemplary signal 300 after being amplitude modulated in accordance with constellation 200. Signal 300 may be either I or Q component signal, namely signals 111 or 112. The amplitude of signal 300, for example, during time period "0 to T" is adjusted to "3" units, and during "T to 5T" period, is adjusted to "1" unit. One unit may be voltage or current or a digital word in an implementation.

Referring to FIG. 1A, I and Q signals 12, 111 pass to filter 103 for proper filtering in accordance with operation of a linear-phase low pass filter. The results are passed to mixer 105, and oscillator 106 for carrier modulation. The resulting signals are summed in a summer 107. A mixer 108 up-converts the summed signal to an appropriate frequency for transmission to receiver 160. An amplifier 109 may amplify the signal before transmission from an antenna 110.

Receiver 160 receives, at an antenna 161, the transmitted signal after being passed through a propagation channel. A mixer 162 down-converts the received signal to a suitable frequency for I and Q demodulation to produce I signal 167 and Q signal 168. A filter 164 may be used to filter signals 167 and 168 before being inputted to a de-map block 165. Signals 167 and 168 may be digitized. The digitization process may be by sampling the signals to produce digital words representing the amplitude of the signals. De-map block 165 determines the most likely bit transmitted by transmitter 100 by sampling the I and Q signals 167, 168 at the correct sampling instants, and comparing them to the legitimate values of −3d, −d, d, and 3d, for example, in accordance with constellation 200. From each signal, 2 bits are derived. The derived bits lead to a 4-bit 16-QAM symbol. The four recovered bits are then passed on as a received data symbol at output 166.

A controller 150 takes several factors into account for calculating the power level of power amplifier 109 as shown in transmitter 100. Controller 150 considers factors such as the propagation path loss between transmitter 100 and receiver 160, and slow and fast fading margins. The power level of amplifier 109 may be calculated based on a power control scheme between transmitter 100 and receiver 160. Transmitter 100 and receiver 160 may also be communicating in accordance with a scheme consistent with any of the known communication systems. Such communication systems generally operate in accordance with a predefined specification. Two of the known specifications are generally identified as WCDMA specification and cdma2000 specifications, incorporated by reference herein. A copy of the specifications may be obtained by contacting 3GPP Support Office, 650 Route des Lucioles-Sophia Antipolis, Valbonne-France. The WCDMA standard and cdma2000 standard also outline a power control scheme between transmitter 100 and receiver 160.

The communications between transmitter 100 and receiver 160 may be over several different types of physical channels. Generally, there are three types of channels, namely, overhead channels, dedicated traffic channels, and common traffic channels. Overhead channels consist of channels essential to the proper functioning of the system, such as common pilot channels, synchronization channels, paging channels, and broadcast channels. Overhead channels are usually transmitted at a constant power, and usually have priority over any other type of channel. Dedicated traffic channels carry information from the transmitter to one particular receiver, and are usually power controlled by a power control mechanism, and often have priority over common traffic channels. Common traffic channels carry information from the transmitter to several receivers. Common traffic channels can be used to multi-cast information to several receivers at the same time, or shared among several receivers in a time division, code division, or frequency division manner.

Figure 4:
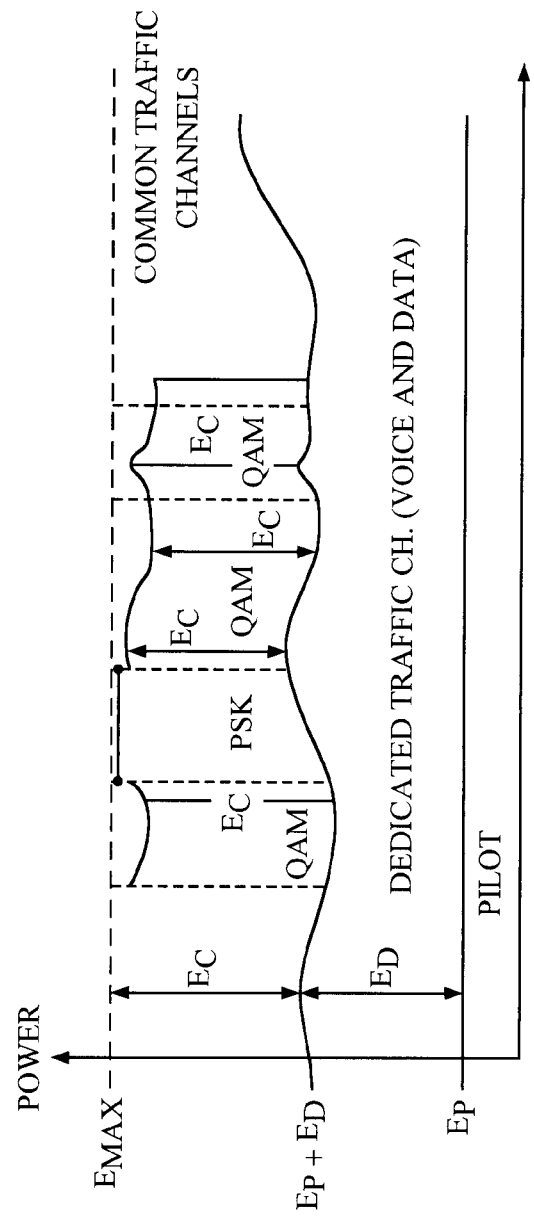
FIG. 4 illustrates a graph representing exemplary power levels assigned to different channels over time.

Transmitter 100 is generally limited to transmit at or below a predefined transmit power level. The transmit power limit may be set by a governmental regulatory standard, or by system design, or both. Referring to FIG. 4, a graph representing exemplary power levels assigned to different channels over time is shown. Transmitter 100 may be allowed to transmit at a maximum power level (Emax.) The power level "Ep" is assigned to the overhead channels. In this example, the overhead channels consist of a single pilot channel. The difference in power level between "Emax" and "Ep" may be assigned to other channels, such as several dedicated traffic channels and one common traffic channel. For example, if "Ed" is the amount of power level assigned to the dedicated traffic channels, the left over power level "Ec" is determined for assignment to the common traffic channel without allowing the total power level to exceed the "Emax" power level. Since the power level assigned to the dedicated traffic channels usually varies over time due to power control, the power level "Ec" also changes correspondingly in order to maintain the total transmit power level at or below the "Emax" level.

The common traffic channel may use different modulation schemes such as QAM or phase shift keying (PSK.) PSK modulations are insensitive to power variations because their decoding relies only on the difference in phase between constellation points. On the other hand, QAM modulations rely in most cases on the phase as well as the amplitude of each constellation point for proper decoding. For example, referring to FIG. 2, constellation points 0011 and 0000 cannot be distinguished based on their phase alone because they both have a phase of 45 degrees relative to the I axis. The power "Ec" allocated to the common traffic channel remain substantially constant during the transmission of a QAM modulated signal. On the other hand, if the signal is modulated using PSK or some other modulation, the power "Ec" can be dynamically varied to use up the most possible leftover transmitter power.

The power level of the dedicated traffic channel is normally determined by a ratio. Several types of a dedicated traffic channel may be included in the communication system. One type of dedicated traffic channel is a traffic channel between a mobile station and a base station. The power level of a dedicated traffic channel is usually controlled. To control the power level of a dedicated traffic channel, the power level of a dedicated traffic channel over the power level of the pilot channel (Ed/Ep) is set to equal to a ratio. The ratio may be derived from a power control scheme that controls the power level of each channel. The power level of the common traffic channel, similarly, is set to equal to a ratio of the common traffic channel power level over the pilot channel power level (Ec/Ep). The power level of the pilot channel may also be determined via a power control scheme between transmitter 100 and receiver 160. The power level ratios Ec/Ep and Ed/Ep may also be determined based on the data rate of the information being communicated via each channel. Normally, transmitter 100 may attempt to transmit at the maximum power level "Emax". After determining the pilot channel power level, the power level for other channels is selected such that the total power is at a level or close to the "Emax" level. Therefore, once the power level of the pilot channel is determined, the power level of other channels is also easily determined based on the power level ratios and the "Emax" level.

A common traffic channel may be modulated using a QAM technique. After determining the power level "Ec" for the QAM modulated common traffic channel, the amplitude of the modulation is also determined such that the power level of the resulting signal does not peak over the maximum power level "Emax". Controller 150 calculates the distance "d" in the constellation such that the power level of the common traffic channel is also maintained in accordance with power ratio Ec/Ep. The distance "d" may be communicated to mapping block 102. The value of distance "d" may also be derived from the power level of the QAM modulated signal. In one calculation, the power level of the QAM modulated signal "Ec" may be equal to 10*d**2 (ten times "d" square.) Therefore, in an alternative, the value "Ec" may be communicated to mapping block 102. In this case the value of "d" is computed from the value of "Ec".

In addition to maintaining the maximum power level below the "Emax" level, the power level ratio Ec/Ep may change in accordance with the power control scheme between the transmitter 100 and receiver 160. In a case where the pilot channel power (Ep) level is kept constant, the desired power level for the common traffic channel may need to be changed in accordance with a power control scheme. As a result, the ratio also changes with the common traffic channel power level. The power level of the common traffic channel may change from one transmission to the next. As such, since the modulation distance "d" affects the power level, controller 150 calculates a new value for the modulation distance "d" for each transmission. Transmitter 100 communicates information related to distance "d" to receiver 160 at the same time or prior to the transmission of the QAM modulated common traffic channel. In an alternative, the new value may be communicated after the transmission. The received symbols are buffered before de-mapping 165. Once the new value is arrived, the de-mapping 165 may properly be performed. The information represents, or can be derived from, the value for distance "d". A controller 190 in receiver 160 communicates the received value "d" to de-map block 165. The de-map block 165 uses the received value for distance "d" to decide a data bit value in the demodulation process. In an alternative, the value of Ec/Ep ratio may be communicated to receiver 160. Controller 190 may use the value of Ec/Ep to arrive at the value of "d" used in the modulation process. The receiver 160 at first may determine the power level of the pilot channel, "Ep". By multiplying the "Ep" by Ec/Ep, the value of "Ec" may be determined. The distance "d" may then be derived from the value of "Ec". The information is used in de-mapping block 165 to accurately perform the demodulation process. Mapping block 102 uses the distance "d" in forming the constellation for the QAM modulation.

The value for distance "d" or Ec/Ep may be communicated via a digital word with finite number of bits. For example, a digital word has a maximum quantization error equal to one half of the difference of values as represented by two adjacent words. If the value for distance "d" in the constellation can not be exactly represented by a digital word, the communicated value for distance "d" is not an exact value. Similarly, if the value for ratio Ec/Ep can not be exactly represented by a digital word, the communicated value for Ec/Ep ratio is not an exact value. Therefore, the receiver 160 may use a value for distance "d" or a value of Ec/Ep in the demodulation process that is different than the value used in the modulation process in transmitter 100. Such an error leads to degraded performance in deciding the value of the received data bits, and hence, degradation in the received bit error rate.

Figure 5:
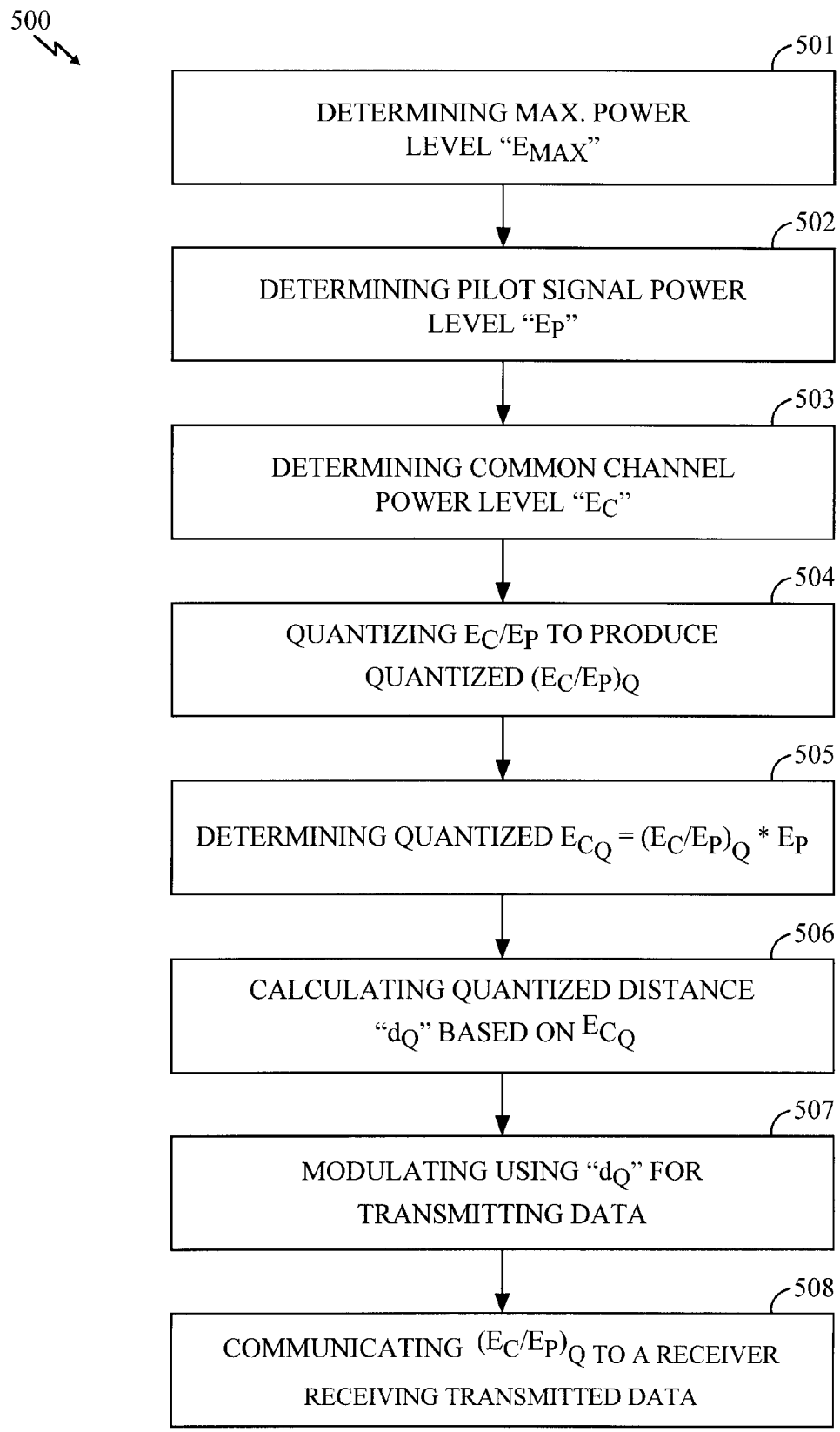
FIG. 5 illustrates a flow chart, in accordance with various embodiments, to provide proper use of modulation distance "d" at a receiver and a transmitter.

In accordance with various embodiments, FIG. 5 depicts a flow chart 500 for transmitter 100 for proper use of modulation distance "d" at receiver 160. Various steps of flow chart 500 may be performed at controller 150 at transmitter 100. At steps 501, 502, and 503, respectively, "Emax", "Ep", and "Ec" are determined. At step 504, controller 150 determines quantized Ec/Ep ((Ec/Ep)Q) ratio. For example, if the digital word used for representing the Ec/Ep ratio is limited to 5 bits, thirty-two possible ratios may be represented. If the value of Ec/Ep ratio falls between two adjacent values as represented by two adjacent words, then, the lower value of the two may be selected for the (Ec/Ep)Q, in accordance with an embodiment. Therefore, the quantized Ec/Ep, (Ec/Ep)Q, ratio would be smaller than the Ec/Ep ratio. At step 505, the quantized value of "Ec" (EcQ) is determined. To determine the value of "EcQ", the ratio (Ec/Ep)Q may be multiplied by the value of "Ep". Normally, there is a relationship between the modulation distance and the power level of the modulated signal. In one example, "Ec" may be equal to ten times square of distance "d". As such, the quantized distance "dQ" may be determined at step 506 based on the "EcQ". The value of "dQ" may be used at step 507 for the modulation process in transmitter 100. The mapping block 102 may use the value of "dQ" for the modulation process. Transmitter 100 at step 508 communicates the value of (Ec/Ep)Q, as represented exactly by a digital word, to receiver 160. In accordance with various embodiments, the word communicated to the receiver 160 would represent the exact value of the Ec/Ep ratio used in the modulation process.

At receiver 160, the operation of demodulating a received signal may take place with the exact value of the Ec/Ep ratio used in the modulation process. Since the exact value of Ec/Ep ratio is communicated to receiver 160, the demodulation process takes place more accurately. In receiver 160, the power level of the pilot channel is measured. The value of the received pilot channel may be used to derive a value for the received power level of the communication channel. The received pilot channel power level (EpR) is multiplied by the received Ec/Ep ratio to arrive at the communication channel received power level (EcR). A value for the modulation distance may be derived from "EcR" based on a relationship between power level of a QAM signal and the modulation distance. The derived modulation distance, when used in the de-map process at de-map block 165, allows a more accurate demodulation process in receiver 160.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:
determining a ratio of power level of a communication channel over power level of a pilot channel to produce a power level ratio;
quantizing said power level ratio; and
communicating said quantized power level ratio from a transmitter to a receiver in said communication system.

2. The method as recited in claim 1 further comprising:
computing a quantized quadrature amplitude modulation distance, in a quadrature amplitude modulation constellation, based on said quantized power level ratio; and
modulating a signal carrying said communication channel, in accordance with a quadrature amplitude modulation technique, using said quantized quadrature amplitude modulation distance.

3. The method as recited in claim 2 further comprising:
transmitting said modulated signal from said transmitter to said receiver.

4. The method as recited in claim 3 further comprising:
receiving said pilot channel from said transmitter;
determining received power level of said pilot channel; and
computing received power level of said communication channel based on said determined pilot channel power level and said received quantized power ratio.

5. The method as recited in claim 4 further comprising:
computing a received quadrature amplitude modulation distance based on said received power level of said communication channel; and
demodulating said received signal based on said received quadrature amplitude modulation modulation distance.

6. An apparatus in a communication system, comprising:
a first controller configured for determining a ratio of power level of a communication channel over power level of a pilot channel to produce a power level ratio, and quantizing said power level ratio to produce a quantized power level ratio; and
a transmitter, coupled to said first controller, configured for communicating said quantized power level ratio.

7. The apparatus as recited in claim 6, wherein said first controller is further configured for computing a quantized quadrature amplitude modulation distance based on said quantized power level ratio.

8. The apparatus as recited in claim 7 further comprising:
signal a quadrature amplitude modulator configured for quadrature amplitude modulating a signal carrying said communication channel using said quantized quadrature amplitude modulation distance in a quadrature amplitude modulation constellation.

9. The apparatus as recited in claim 8 wherein said transmitter is configured for transmitting said modulated signal to a receiver.

10. The apparatus as recited in claim 9 wherein said receiver is configured for receiving said quantized power level ratio.

11. The apparatus as recited in claim 10 further comprising:
- a second controller, coupled to said receiver, configured for determining received power level of said pilot channel, and computing said communication channel power level based on said determined pilot channel power level and said quantized power level ratio.

12. The apparatus as recited in claim 11 wherein said second controller is configured for computing a received modulation distance based on said communication channel power level.

13. The apparatus as recited in claim 12 further comprising:
- a demodulator for demodulating said received signal based on said received modulation distance.

14. A communication system comprising:
- a first controller configured for determining quantized power level ratio of a communication channel over a pilot channel, and determining a quantized quadrature amplitude modulation distance;
- a modulator configured for modulating a signal carrying said communication channel in accordance with a quadrature amplitude modulation technique using said quantized quadrature amplitude modulation distance in a quadrature amplitude modulation constellation;
- a second controller for receiving the modulated signal computing a received quadrature amplitude modulation distance from a received quantized power level ratio; and
- a demodulator configured for demodulating said received signal based on said received quadrature amplitude modulation distance.

15. A method in a communication system, comprising:
- determining a ratio of power level of a communication channel over power level of a pilot channel to produce a power level ratio;
- quantizing said power level ratio;
- computing a quantized quadrature amplitude modulation distance, in a quadrature amplitude modulation constellation, based on said quantized power level ratio;
- modulating a signal carrying said communication channel, in accordance with a quadrature amplitude modulation technique, using said quantized quadrature amplitude modulation distance;
- transmitting said modulated signal;
- receiving said modulated signal and said quantized power ratio;
- determining received power level of said pilot channel;
- computing received power level of said communication channel based on said determined pilot channel power level and said received quantized power ratio;
- computing a received modulation distance from said received power level of said communication channel; and
- demodulating said received signal based on said received modulation distance.

* * * * *